United States Patent [19]

Henry

[11] 4,177,482
[45] Dec. 4, 1979

[54] POPULATION AND PROFILE DATA OF BODIES IN A TRANSPARENT MASS

[75] Inventor: James W. Henry, Kingsport, Tenn.

[73] Assignee: Eastman Kodak Company, Rochester, N.Y.

[21] Appl. No.: 913,401

[22] Filed: Jun. 7, 1978

Related U.S. Application Data

[63] Continuation-in-part of Ser. No. 790,792, Apr. 21, 1977, Pat. No. 4,121,247.

[51] Int. Cl.$^2$ ............................................... H04N 7/18
[52] U.S. Cl. ................................. 358/93; 235/92 PC; 356/129; 358/106; 358/107; 358/903
[58] Field of Search ............... 358/93, 107, 106, 903; 356/129; 235/92 PC

[56] References Cited
U.S. PATENT DOCUMENTS

| | | | |
|---|---|---|---|
| 3,922,532 | 11/1975 | Kitchener | 358/107 |
| 3,967,053 | 6/1976 | Grosskopf | 358/107 |
| 4,047,205 | 9/1977 | Grosskopf | 358/107 |

OTHER PUBLICATIONS

Soviet Journal of Optical Technology, vol. 41, No. 9, Sep. 1974, pp. 406–409.

Primary Examiner—Howard W. Britton
Attorney, Agent, or Firm—John F. Stevens; Daniel B. Reece, III

[57] ABSTRACT

Population and/or profile data of bodies contained within a transparent mass are obtained using a schlieren optical system in combination with a television camera, video analyzer, analog signal comparator and digital computer. The bodies, normally indistinguishable from the transparent mass by the unaided eye, are detected by the schlieren optical system and a television camera produces a video signal which is suitably processed, by the apparatus and method described, for introducing into a digital computer. The invention is especially useful as a means for quality control in various chemical operations.

10 Claims, 4 Drawing Figures

POPULATION AND PROFILE DATA OF BODIES IN A TRANSPARENT MASS

This is a continuation-in-part of pending U.S. application Ser. No. 790,792, filed Apr. 21, 1977, now U.S. Pat. No. 4,121,247.

BACKGROUND OF THE INVENTION

1. Field of the Invention

This invention relates in general to the use of a schlieren optical system in combination with a television camera and video signal processing equipment for the examination of specimens containing parts which have different refractive indexes. More particularly, this invention relates to the use of such method and apparatus for obtaining population and/or profile data of bodies contained within a transparent mass. The bodies may be transparent or otherwise not distinguishable by the unaided eye, which are contained within a transparent mass.

This invention is particularly useful in quality control techniques in the production of chemicals. For example, transparent polymers often contain transparent particles or bodies which are indistinguishable by the unaided eye. These bodies may be residues from raw materials, foreign bodies, or perhaps malformed portions of the polymer itself. Such bodies are particularly objectionable in solutions or melts of the polymer when spinning or casting operations are undertaken. By examination of such bodies, which normally cannot be seen by the unaided eye using conventional techniques, the population and profile data will allow quality determinations to be made. Also, such data will likely lead to the identity of such bodies so steps can be taken to eliminate them. By use of the population and profile data derived by the present invention, it is possible to determine accurately the quality of a particular specimen, study the causes of poor quality material and possibly eliminate such causes. Examination of other specimens using this method and apparatus will be apparent to those skilled in the art.

2. Description of the Prior Art

In the manufacture of certain products formed from polymers such as cellulose acetate, vinyl chloride, and other polymers which are soluble in organic volatile solvents, difficulty is frequently encountered with portions of the polymer which are not fully soluble in the solvent. These portions tend to swell in some instances, or in other instances they become only partially dissolved, forming gels suspended in the polymer solution. Large portions can be detected and removed by conventional techniques, but the smaller portions tend to interfere with normal manufacturing operations, frequently stopping up holes in extrusion nozzles used to form fibers, or producing hard lumps in the surface of sheeting materials formed from the polymer.

Schlieren optical systems are well known in the art and have been used for observing phenomena involving optical-path differences which result in light beam deflections such as, for example, the checking of mirrors wherein the optical-path differences derive from defects in the mirror, or the analysis of fluid flow in wind tunnels wherein a model is immersed in a gas stream and the optical-path differences derive from the refractive-index variations related to pressure variations. The principle used in observing these phenomena is that the light rays passing through the object being observed are deviated by different amounts depending on the refractive index gradient, which corresponds to the concentration gradient.

Patents relating to schlieren optical systems and/or uses thereof include U.S. Pat. Nos. 3,847,484 and 3,767,306. Also of interest is Krosovskii et al, "The Sensitivity Threshold of an Autocallination Television Shadow-Graph," Sov. J. Opto Technol., Vol 41, No. 9, September, 1974, p. 406–409 and and C. L. Strong, "A Laser Beam and a Photocell are Used to Measure the Dirt Content of Water," The Amateur Scientist. U.S. Pat. No. 3,847,484 discloses laser light used in a schlieren system for studying the distribution of molecular density in solution under the influence of a centrifugal force, and the Krasovskii et al article relates to television shadowgraphs used for studying transparent optical media.

SUMMARY OF THE INVENTION

The present invention provides a method of obtaining population and/or profile data of bodies within a transparent mass which may not be capable of being observed by the unaided eye either because of their size, their transparency, or both. Specimens may be continuously monitored, and with the use of the present method and apparatus, information about the specimen, such as population and/or profile data of bodies within it may be periodically or continuously available. Samples are inspected by a schlieren optical system and a television camera. The video signal from the camera is processed as described hereinafter and introduced into a digital computer.

This invention provides a method and apparatus for converting a video signal into electrical impulses which can be translated into numerical information relating to the size or dimensional information of the bodies, the number of the bodies, and statistical information relating to the population distribution of such bodies.

DETAILED DESCRIPTION OF THE INVENTION

Figure 1:
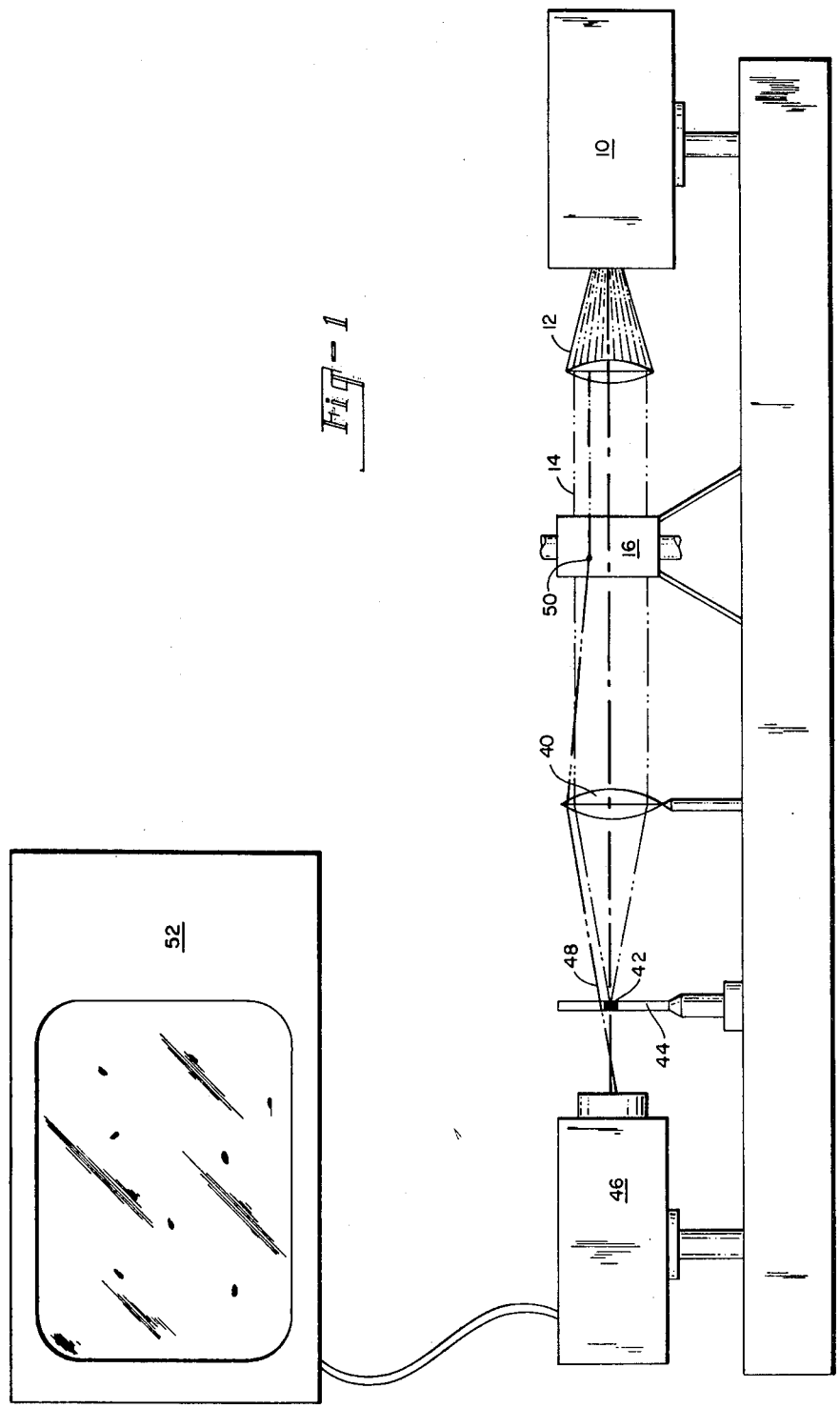
FIG. 1 is a diagrammatic illustration of apparatus used for examining specimens.

Population and profile data of bodies contained within a transparent mass may be displayed on a kinescope display device as described and claimed in U.S. Pat. No. 4,121,247 of which this is a continuation-in-part. The bodies may not be distinguishable from the mass by the unaided eye, but the bodies have different indexes of refraction from the mass. A specimen of the mass containing the bodies is moved into an optical viewing position, wherein a collimated beam of light rays is passed through it to an objective lens and occulting stop to form a schlieren optical system. Rays penetrating the transparent bodies are deviated from the columned beam of light because of a difference in refractive index between the bodies and the transparent mass to form an image of the profile of the bodies within the mass. A sufficient number of the deviated rays to form an image of each body within the viewing area is detected by a television camera and the image is converted into a video signal which is used as the input to a kinescope display device or suitably processed and fed into a digital computer. The kinescope display device amplifies the image of the bodies with respect to contrast and size, to display images of the bodies whereby their relative size and profile may be examined. The light rays which pass through the transparent mass without intercepting the bodies remains columned, and are subsequently condensed and occulted by an obstruction (such as an opaque spot) in its path.

By the term "profile data," it is intended to mean the two-dimensional outline, size, area, etc. Obviously the method and apparatus may be used to obtain as much or as little of the available data as desired. Thus, "profile data" does not require the inclusion of all such data.

Although opaque bodies which are normally visible will be detected and will register in the present apparatus and method, it is primarily designed to work with transparent bodies which are normally not visible to the unaided eye. "Transparent bodies within a transparent mass" refers to a heterogeneous or homogeneous mass, wherein at least one transparent portion of one refractive index is intimately associated with at least one transparent portion of another refractive index. The bodies and the mass may be of the same or different composition. Examples of transparent bodies within a transparent mass include gels contained within solutions of transparent polymer, transparent solids contained within polymer melts, and irregularities in transparent film.. It is contemplated that the bodies and the masses may be solids, liquids or gases, or mixtures thereof. Since the bodies and the masses are usually indistinguishable by the unaided eye, they have different refractive indexes due to differences in density, etc.

This invention provides an especially convenient means for monitoring, and thereby obtaining population and/or profile data from a continuously advancing solution, melt, film, etc. For example, in melt or solution spinning of fibers, or casting of film, a portion of the feed may be bled off and monitored for quality control purposes.

The specimen is normally moved into optical viewing position by holding or passing it flat against an optical window or in the case of liquids, into a passage, at least two sides of which are formed by optical windows. By the term "optical windows" it is intended to mean transparent windows which are free of any significant schlieren effect.

The columned beam of parallel light rays may be derived from any convenient source such as a laser beam, a point source, or concentrated filament incandescent lamp. If a laser beam is used, a small-diameter beam may be expanded and recolumnized. Point sources such as a zirconium arc or incandescent lamp may be collimated by conventional optical means.

The schlieren optical system is known in the art. Typically, this optical system includes a source of light which is shielded so that only a small opening emits light. A lens is placed at its focal distance from the opening so that the light is bent into a parallel beam. A second lens collects the parallel beam into an image of the opening and forms an inverted image on the screen or photographic plate. If a knife edge is moved into the light stream near the opening image, the image darkens uniformly.

The schlieren system is based on the fact that the density gradient is also a refractive index gradient. In the schlieren system, light rays passing through the cell are deviated by different amounts depending on the refractive index gradient, which corresponds to the density gradient. The schlieren system translates these deviations into a pattern showing change in refractive index as a function of distance from the axis of rotation.

In such a system, also termed sometimes a "schlieren or strioscopic" apparatus, an image-carrying beam is partially occulted by an opaque surface or knife known as Foucault knife. Such systems are generally used for observing phenomena involving optical-path differences which result in light-beam deflections, such as, for instance; the checking of mirrors, wherein the optical-path differences derive from defects in the mirror; or the analysis of fluid flows, e.g., in wind-tunnel arrangements, in the neighborhood of a mock-up immersed in a gas stream, wherein the optical-path differences derive from the refractive-index variations related to pressure variations.

Figure 3:
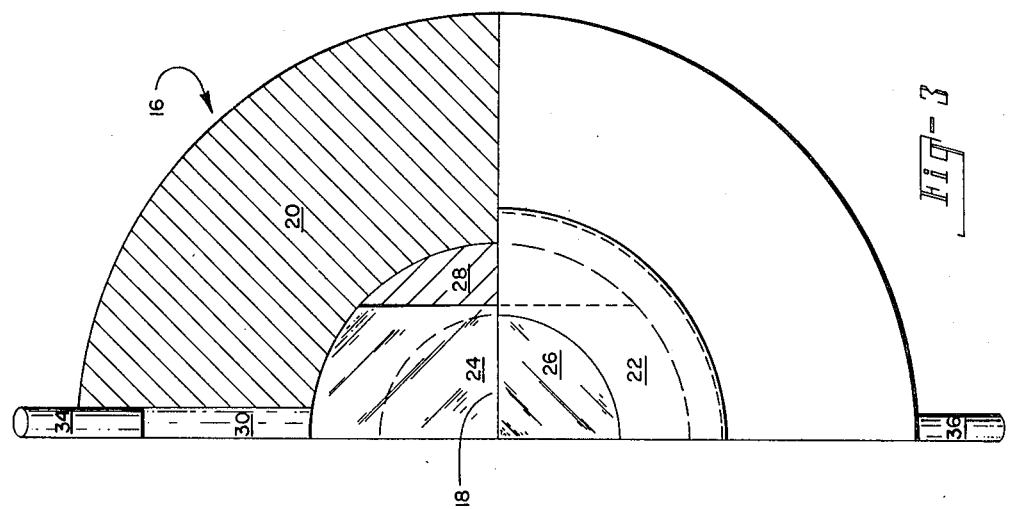
FIG. 3 is an elevational view, partly in section, of the optical cell shown in FIG. 2.
Figure 2:
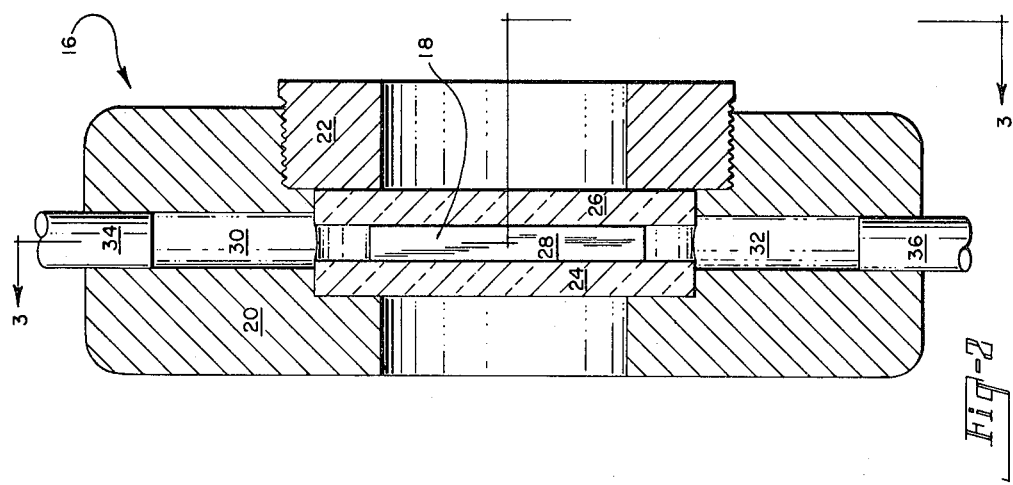
FIG. 2 is a side elevational view in section of one form of an optical cell.

Referring to the drawings, light source 10 is preferably a laser which includes beam expander section 12, for diverging the light rays of a small column from the laser and recolumnizes the rays into a larger column 14 of parallel light rays. Column 14 is directed through an optical cell 16, shown in greater detail in FIGS. 2 and 3. Cell 16 may contain a stationary or moving specimen. This invention is of particular significance when cell 16 is provided with a passage 18 for the movement of a fluid specimen for continuous examination. Cell 16 is provided with a casing 20 and closure plug 22. The casing contains optical windows 24 and 26 spaced apart by a pair of D-shaped spacers 28 which help define passage 18. Cell 16 has an inlet opening 30 and outlet opening 32 for the feed and discharge of the specimen. Openings 30 and 32 mate with conduits 34 and 36 respectively. The specimen flows in through conduit 34, into opening 30 and into passage 18 where it is in position for examination. It may then be moved through opening 32, and finally exit through conduit 36. If the specimen is moving, any convenient means may be used to maintain movement of the specimen, such as pressure or gravity.

Light rays passing through cell 16 which are not deviated from the column by bodies of a refractive index different from the mass continue columned to the condensing lens 40. The apex of the condensed cone is occulted by an opaque spot 42 on transparent plate 44. Rays which are deviated from the column and which pass through lens 40, however, are able to avoid the occulting spot 42 and continue through the transparent plate 44 and be detected by the television camera 46, as shown diagrammatically by the line 48.

Television camera 46, by conventional means, may be used to amplify the size and contrast of the image of body 50, and the video signal generated thereby is shown as an image or group of images, which depict the relative size and profile of the body 50 on the kinescope display device 52.

It is preferred that the focal length of lens 40 be relatively large so as to result in a relatively large depth of field in cell 16. Thus, for a depth (thickness of passage 18 as measured parallel to the light rays of FIG. 2) of say a focal length of about 7 to 9 inches is very acceptable. The focal length can be adjusted, of course, by use of different lens 40, using the formula $$1/f = (1/d_1) + (1/d_2)$$

where $d_1$ is the object distance, $d_2$ is the image distance, and f is the focal length. This principal of physics is well known in the art, e.g., Modern College Physics, Third Ed. by Harvey E. White, published by D. Van Nostrand Company, Inc. Thus, bodies over the entire thickness of the specimen should appear in reasonable focus on the kinescope display device.

Since the transparent bodies being displayed will often be of a very minute size, it is preferable to magnify their size electronically through the television camera and kinescope display device in a ratio, for example, of 1 mm = 10 microns.

Figure 4:
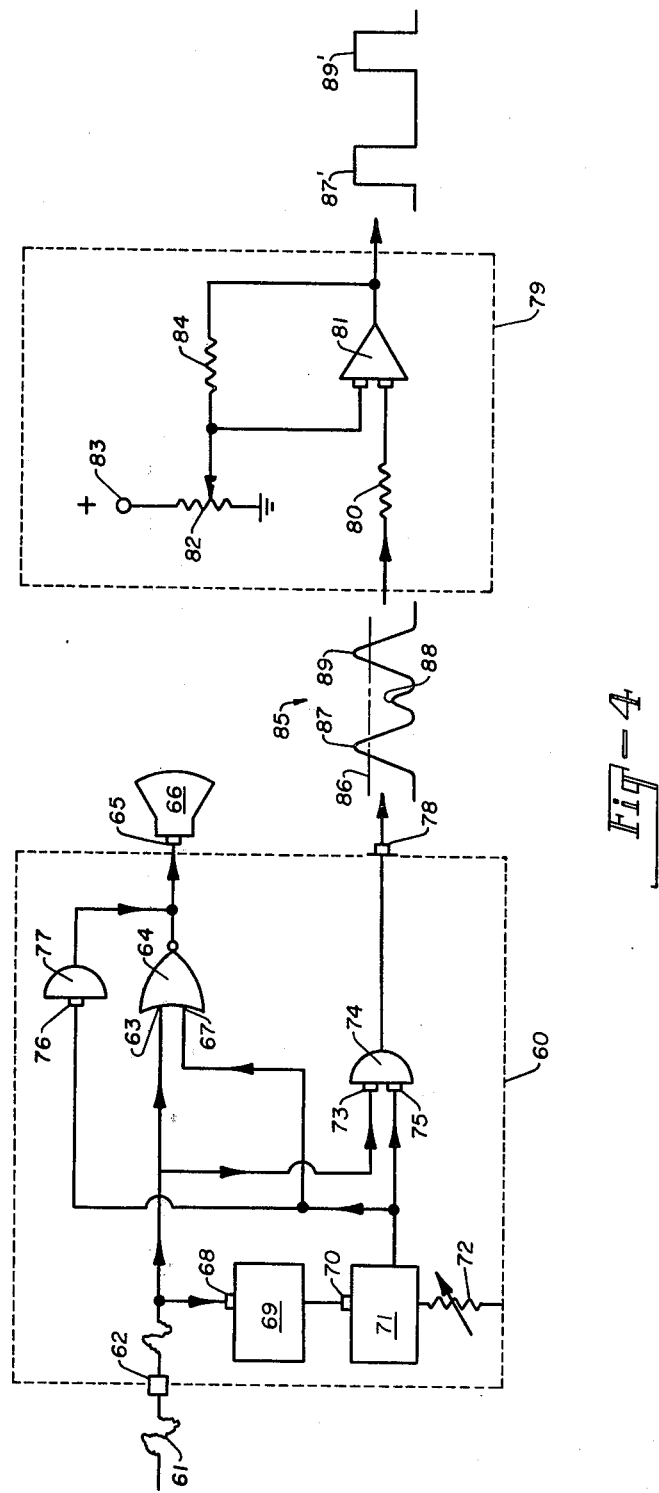
FIG. 4 is a circuit diagram of equipment suitable for converting a video signal into pulses suitable for feeding into a digital computer in accordance with this invention.

The video signal from the television camera 46 may be processed and fed into a digital computer to obtain numerical data for information such as number of bodies, dimensions, shape, etc., viewed by the television camera during a predetermined time period. A system for such processing is shown in FIG. 4. The video signal is fed to a video analyzer system 60 where it is displayed on a kinescope monitor 66 while selected parts thereof are simultaneously displayed as a line on the kinescope monitor and fed to an analog signal comparator system 79. The output signal from video analyzer system 60, having the simulated waveform illustrated in FIG. 4, is applied to the analog signal comparator system 79 where it is shaped, generally into the form illustrated, so that it is suitable for feeding into a digital computer (not shown). Pulses from the analog signal comparator system are fed to the digital computer which is programmed to arrange them into useful information using count and pulse widths.

It is preferred in most instances to display the video signal on a kinescope monitor 66. Obviously, however, such display is not necessary for processing the video signal to be fed into a digital computer.

The video signal produced by a standard television camera is an electrical signal characterized by a content of electrical alternating wave frequencies ranging from 30 hertz to as high as 35 megahertz. The amplitude of the waves contained within this band of frequencies defines the brightness of the portion of the television picture associated with the wave. The frequency defines the size of the picture element associated with the wave portion. High amplitudes represent bright picture elements. High frequencies represent small picture elements.

In digital analysis of a picture describing the number and size of bodies within a picture field covering the display of the schlieren optical system, the brightness of the image can be reduced to a binary number in which presence of a signal above a minimum level represents a body being present, and lack of such a body is represented by a signal which falls below the minimum level. In digital logic parlance, presence of a body is defined as a 1. Absence of a body is defined as a zero. Simplification of the signal description relative to amplitude conditions to a 1 or zero state makes possible the elimination of complicated electronic circuits capable of handling the wide range of signals which are required to synthesize a complex wave form which would normally describe the presence of a body or particle in terms of varying shades of gray.

Once the presence or absence of a body can be defined simply in terms of yes-one or no-zero, the remaining matter of concern is that of the size of the body. This matter can be resolved by determining the length of time the signal remains in the yes-one condition. This time, designated by pulsewidth, defines the size of the body because the steady motion of the electron horizontal scanning beam of the television camera requires a finite time to cross over the area illuminated by the presence of the body.

The operation of the video analyzer system 60, which is designed to convert the video signal received from a standard television camera into a waveform suitable for being introduced into an analog signal comparator system 79, may be described as follows.

The video signal 61 from the television camera 46 is applied through a suitable electrical input terminal means 62 to the first input terminal 63 of a NOR gate 64. The output of the NOR gate is electrically connected to the input terminal 65 of a kinescope monitor system 66. Thus, so long as no control signal is present at the second input terminal 67 of the NOR gate 64, the video signal 61 applied to terminal 63 is passed through the gate to and is displayed on the kinescope monitor 66.

The video signal 61 from the television camera is also simultaneously applied via input terminal means 62 to the input terminal 68 of a suitable horizontal synchronization pulse separator circuit 69. Each horizontal synchronization pulse contained in the video signal 61 is detected by this circuit and, after being suitably reshaped, is applied as a trigger pulse from the output of circuit 69 to the input terminal 70 of a synchronization pulse timer circuit 71. Circuits 69 and 71 may be contained in a single unit, if desired.

The trigger pulse from circuit 69 starts the running of the synchronization pulse timer circuit 71, which is designed to produce a single control pulse at its output terminal of a predetermined duration for each trigger pulse received. An adjustable potentiometer 72 is electrically connected to circuit 71 and is used to adjust the point in time when the leading edge of the control pulse appears on the output terminal of the circuit in relationship to the time at which the leading edge of the trigger pulse appeared at the input terminal 70 of the circuit.

The first input terminal 73 of an AND gate 74 is electrically connected directly to the input terminal 62. The second input terminal 75 of the AND gate 74, as well as the second input terminal 67 of NOR gate 64, is electrically connected to the output terminal of the synchronization pulse timer circuit 71. Preferably, amplifier circuit 77 is used in connection with this invention. However, amplifier circuit 77 may be omitted if desired. If used, the input terminal 76 of an amplifier circuit 77 is, also electrically connected to the output terminal of circuit 71.

As the leading edge of the control pulse from the synchronization pulse timer circuit 71 appears on the second input terminal 67 of NOR gate 64, it turns this gate off thereby removing the video signal from the kinescope monitor circuit 66. Simultaneously, the leading edge of the control pulse appears at the input terminal 76 of the amplifier circuit 77 wherein it is processed and applied through the output terminal of this circuit to the input terminal 65 of the kinescope monitor 66. This results in part of a vertical line being produced on the face of the kinescope which is the width of the control pulse and is positioned on the kinescope face in accordance with when the control pulse is generated in reference to the horizontal synchronization pulse. Once the trailing edge of the control pulse passes, the NOR gate 64 is turned back on and the output from amplifier circuit 76 terminates.

When the leading edge of the control pulse from the synchronization pulse timer circuit 71 is applied to the second input terminal 75 of AND gate 74, the gate is turned on thereby passing the video signal from input terminal 62 to the output terminal 78 of the video analyzer system 60. This passing of the video signal through AND gate 74 will continue so long as the control pulse is present at input terminal 75.

As will be appreciated, through the use of this video analyzer system, the face of the kinescope monitor circuit will display the picture being picked up by the television camera plus a vertical line that represents the position and portion of the video signal that is being passed through AND gate 74 to the analog signal comparator circuit 79. Thus, a line selection is provided wherein one sample of a predetermined width is taken at a preselected point in each horizontal sweep line of the kinescope. This sample, combined with the others so taken, forms a vertical line or row. The preselected point at which the samples are taken, and therefore the position of the vertical line formed by the samples, can be electrically positioned to any point on the kinescope face by adjusting potentiometer 72. The sampled output appearing at output terminal 78 of the video analyzer system 60 is in a form suitable for being fed directly into the analog signal comparator circuit 79.

Video analyzer systems, as described generally above, are commercially available. For example, Video Analyzer 301 and Video Analyzer 302 are available from Colorado Video, Incorporated of Boulder, Colorado.

The video signal taken from the output terminal 78 of the video analyzer system 60, representing a slow-scan video signal showing the luminosity of points sampled along a vertical line which intersects each of the scanning lines of the video picture, is fed into the analog signal comparator circuit 79. A typical example of such a circuit is shown although other circuitry for accomplishing this function will be apparent to those skilled in the art. The video signal is fed through a resistor 80 to an analog signal comparator 81. The comparator (type LM 311 manufactured by Intersil Corporation) delivers a digitized signal only if the introduced signal exceeds the level of a threshold voltage taken from a power source, such as shown by variable potentiometer 82. The excitation of the potentiometer is taken from a suitable direct current power supply 83 which also serves as excitation for the comparitor circuit. A feedback loop including a resistor 84 connects the output of comparitor 81 to the threshold input signal. This resistor defines the sensitivity of the comparator to signal differences.

A portion of the video signal from output terminal 78 of the video analyzer system 60 being electrically applied to the analog signal comparator circuit 79 is illustrated at 85. The threshold voltage set by the adjustment of potentiometer 82 is indicated by broken line 86. Signals of varying strengths which represent various light and dark areas viewed by the television camera are depicted as pulses 87 through 89. As is apparent, the amplitude of these pulses varies depending on the brightness of the target being viewed while the width of the pulse is proportional to the duration of the target in that part of the camera's viewing area.

When the leading edge of a pulse, such as pulse 87, rises above the threshold voltage setting 86, the analog signal comparator circuit 79 is turned on and produces the leading edge of an output pulse, such as pulse 87'.

When the trailing edge of the pulse 87 falls below the threshold voltage setting, the analog signal comparator circuit 79 is turned off thereby terminating pulse 87'. This pulse generating process is repeated with each video signal pulse in pulse train 85 that exceeds the predetermined setting of the threshold voltage level 86.

As will be apparent, video input pulses that do not exceed this threshold voltage level, such as pulse 88, will not activate or turn on the analog signal comparator circuit 79 and thus will not appear in the output pulse train.

Pulses from the analog signal comparator circuit 79 are then fed in a conventional manner to a digital computer, which uses the count and width of the pulses to provide numerical information on bodies contained within a mass moving through the television cameras field of view.

Upon analyzing a signal taken from a schlieren examination of cellulose triacetate particles suspended in cellulose diacetate polymer in solution in acetone, it is found that the portions of the video picture representing the particles produces a square wave output from the output of the comparator. The magnitude of the square wave is constant, but the width varies with the diameter of the particles under the sampling line of the video analyzer system as that line is imposed on the screen of the kinescope monitor.

The square wave signal produced as described above, or by other means such as amplification in a limiter amplifier to the point where wave squaring is effected, or by shaping in a diode clipping circuit, is well suited for introduction to the input system of conventional electronic digital counters such as, for example, the series manufactured by the Hewlett-Packard Company and marketed under the series number 5300. The square wave produced by analog signal comparitor 79 is introduced to the counter. The counter registers one count for each square wave introduced to it. The total count over a count of 4000 sample scans is found to agree with that produced by a digital computer supplied with the same signal.

A digital computer may be programmed as a counter to register and manipulate the count recorded to produce a record which matches that produced by a simple digital counter. In addition, the computer can be programmed to arrange the count of particles according to the size of the particle, so that a histogram of particles passing before the television camera is produced.

In addition to the simplified means of producing a signal suitable for introduction to a computer, an analog-to-digital converter system which translates the grey scale of the video image into a digital code and stores it in the computer memory may be used. Once in memory, the computer is programmed to accept digital codes representing a level above the threshold established, and to reject those codes representing levels below the threshold. A count of the acceptable codes is made and the time during which the code is received recorded. One count is recorded for each time the code is received. The count is distributed in the record according to the time duration of the code received. A single video frame representing 1/30 second of time is digitized by the analog to digital converter and entered into the computer memory. Each line of the video image is examined for bright spots representing particles. Upon encountering a bright spot, the positions of beginning and ending are entered into memory. The next succeeding scan is also examined as is each succeeding scan. If the bright spots of the succeeding lines match those of the preceeding line, notation is made that the particle has not been fully scanned. Each scan is recorded until the last entered scan fails to show presence of a particle. It is then indicated that a single particle has been scanned. The number of lines during which the particle has been observed are noted, and the line showing the greatest length of the bright spot is also noted. These notations are recorded as measurements of the particles' length and breadth. The register indicating the presence of particles is divided into particle measurement spans. The entry is made in the appropriate register for the particle size measured.

Some samples of polymer solutions produce particle count signals which translate into histograms unique to that sample's quality range. Since these histograms of particle size and population do correlate with the sample's quality, it is possible to use the histogram as a measure of quality for the sample. The numerical nature of the histogram lends itself to exact comparison with other histograms representing samples of different qualities. Thus, a quantitative comparison of quality of the sample can be determined, based on the histogram describing the particle content and particle size distribution within the sample.

In a computer program wherein a histogram record is formed from the numerical input describing the particle size and population of a given sample, a standard histogram describing a sample of known and desirable quality is stored in nonerasable memory. As the histograms describing the sample data is completed, the computer is programmed to compare the numerical data describing the population of particles within each particle size range for the sample and the stored reference histogram. The peak of each size distribution curve is noted, and the skew between the sample curve and the curve taken from the histogram noted. If this skewing of the sample curve deviates by a predetermined amount from the stored histogram curve, the computer activates circuits which ultimately culminate in the activation of an audible and visual signal warning the operators that the sample is exceeding the quality tolerance limits set for it.

The invention has been described in detail with particular reference to preferred embodiments thereof, but it will be understood that variations and modifications can be effected within the spirit and scope of the invention.

I claim:

1. Method of obtaining data of bodies contained within a transparent mass wherein said bodies and said mass have different indexes of refraction comprising
   (a) moving a specimen of the mass containing said bodies into an optical viewing position wherein said specimen is intercepted by a columned beam of parallel light rays of a schlieren optical system whereby rays penetrating said mass are maintained in a columned state and rays penetrating said bodies are deviated from said columned beam of light to form an image of the profile of said bodies within said mass,
   (b) detecting at least a portion of said deviated rays by a television camera, and converting the image into a video signal,
   (c) electrically applying said video signal to the input of separator circuit means which is adapted to produce a control pulse on its output terminal of predetermined duration for each horizontal synchronization pulse contained in said video signal,
   (d) electrically applying the video signal and the control pulse from the separator circuit means to separate input terminals of gate means adapted to pass said video signal through to its output terminal whenever said control pulse is applied to said second input terminal,
   (e) electrically applying the output signal from said gate means to comparator means for converting all pulses of greater than a predetermined amplitude contained within said passed video signal into a digitized signal, and
   (f) feeding the digitized signal into a digital computer whereby the signal is processed into said data.

2. Method according to claim 1 wherein said bodies are transparent.

3. Method according to claim 1 wherein said bodies are invisible to the unaided eye.

4. The method of claim 1 which includes electrically applying the video signal and the output of said separator circuit means to the input of a second gate which is adapted to pass the video signal through to its output terminal whenever said control pulse is absent from said second input terminal, and electrically applying the output of said second gate to a kinescope monitor to display said video signal.

5. The method of claim 4 which includes electrically applying the output of said separator circuit to the output of said second gate, whereby said control pulse appears as a vertical line on the kinescope monitor.

6. The method of claim 5 which includes passing said control pulse through an amplifier circuit prior to applying it to said kinescope monitor.

7. Apparatus for obtaining data from bodies contained within a transparent mass wherein said bodies and said mass have different indexes of refraction comprising
   (a) means for supporting a specimen for examination such that at least the portion to be examined lies in a predetermined position,
   (b) means for directing a collimated beam of light rays into said specimen whereby rays striking portions of a particular refractive index are maintained in a collimated state and rays striking portions of other refractive indexes are deviated from said collimated beam,
   (c) means for condensing said collimated beam subsequent to passing through said specimen,
   (d) means for occulting said condensed column,
   (e) a television camera positioned to receive at least a portion of the light rays which are deviated from said column for producing a video signal thereof;
   (f) separator circuit means adapted to produce a central pulse on its output terminal of predetermined duration for each horizontal synchronization pulse contained in said video signal,
   (g) gate means having a first input terminal electrically connected to said video signal and a second input terminal electrically connected to said output terminal of said separator circuit means, said gate means being adapted to pass said video signal through to its output terminal whenever said central pulse is applied to said second input terminal,
   (h) comparator means connected to said output terminal of said gate means for converting all pulses of greater than a predetermined amplitude contained within said passed video signal into a digitized signal, and (i) a digital computer arranged to receive the digitized signal whereby the signal is processed into said data.

8. Apparatus according to claim 7 wherein a second gate having a first input terminal electrically connected to said video signal and a second input terminal connected to said output terminal of said separator circuit means, said second gate means being adapted to pass said video signal through to its output terminal whenever said control pulse is absent from said second input terminal, and a kinescope monitor electrically connected to said output terminal of said second gate means for displaying said video signal.

9. Apparatus according to claim 8 wherein said output terminal of said separator circuit means is connected to said output terminal of said second gate means whereby said control pulse appears as a vertical line on said kinescope monitor.

10. Apparatus according to claim 8 which includes amplifier circuit means for the control pulse being applied to said kinescope monitor.

* * * * *